US011270031B2

United States Patent
Savidis et al.

(10) Patent No.: US 11,270,031 B2
(45) Date of Patent: Mar. 8, 2022

(54) SECURING ANALOG MIXED-SIGNAL INTEGRATED CIRCUITS THROUGH SHARED DEPENDENCIES

(71) Applicant: Drexel University, Philadelphia, PA (US)

(72) Inventors: Ioannis Savidis, Wallingford, PA (US); Vaibhav Venugopal Rao, Philadelphia, PA (US); Kyle Joseph Juretus, Quakertown, PA (US)

(73) Assignee: Drexel University, Philadelphia, PA (US)

(*) Notice: Subject to any disclaimer, the term of this patent is extended or adjusted under 35 U.S.C. 154(b) by 121 days.

(21) Appl. No.: 16/862,111

(22) Filed: Apr. 29, 2020

(65) Prior Publication Data

US 2020/0342142 A1 Oct. 29, 2020

Related U.S. Application Data

(60) Provisional application No. 62/839,858, filed on Apr. 29, 2019.

(51) Int. Cl.
*G06F 21/75* (2013.01)
*H03K 21/02* (2006.01)
*H03K 5/1532* (2006.01)
*H03M 1/36* (2006.01)

(52) U.S. Cl.
CPC ........... *G06F 21/75* (2013.01); *H03K 5/1532* (2013.01); *H03K 21/02* (2013.01); *H03M 1/365* (2013.01)

(58) Field of Classification Search
CPC .. H03K 5/1532; H03K 5/1534; H03K 5/1536; H03K 21/02; H03K 21/026; G06F 21/75
See application file for complete search history.

(56) References Cited

U.S. PATENT DOCUMENTS

| | | | | |
|---|---|---|---|---|
| 4,777,629 A | * | 10/1988 | Morris | G01V 1/26 327/58 |
| 10,970,441 B1 | * | 4/2021 | Zhang | G06F 30/33 |
| 2015/0276824 A1 | * | 10/2015 | Narayanan | G01R 31/3181 324/750.3 |
| 2016/0227135 A1 | * | 8/2016 | Matolin | H04N 5/2351 |
| 2019/0036538 A1 | * | 1/2019 | Tanaka | H03M 1/002 |

* cited by examiner

*Primary Examiner* — Patrick C Chen
(74) *Attorney, Agent, or Firm* — Schott, P.C.

(57) ABSTRACT

The transition to a horizontal integrated circuit (IC) design flow has raised concerns regarding the security and protection of IC intellectual property (IP). Obfuscation of an IC has been explored as a potential methodology to protect IP in both the digital and analog domains in isolation. However, novel methods are required for analog mixed-signal circuits that both enhance the current disjoint implementations of analog and digital security measures and prevent an independent adversarial attack of each domain. A methodology generates functional and behavioral dependencies between the analog and digital domains that results in an increase in the adversarial key search space. The dependencies between the analog and digital keys result in a 3× increase in the number of iterations required to complete the SAT attack.

8 Claims, 3 Drawing Sheets

SECURING ANALOG MIXED-SIGNAL INTEGRATED CIRCUITS THROUGH SHARED DEPENDENCIES

STATEMENT REGARDING GOVERNMENT SUPPORT

This invention was made with government support under Contract No. CNS-1751032 awarded by the National Science Foundation. The government has certain rights n the invention.

BACKGROUND

Malicious modifications to integrated circuits (ICs) represent a serious threat to the security of the entire computing stack, with back doors and a variety of counterfeit ICs having already been discovered within military ICs. The security threats at the hardware level are expected to increase as the IC manufacturing flow transitions to a horizontal model, where manufacturing, testing, and intellectual property (IP) are procured from third-parties.

Untrusted third-parties within the IC design flow possess the ability to steal IP, counterfeit and overproduce ICs, and insert harmful circuit modifications (hardware Trojans).

According to a report by Information Handling Services (IHS) Markit, the top five most counterfeit types of semiconductors include analog ICs, microprocessors, memory, programmable logic ICs, and discrete transistors, which represents an annual potential risk of approximately $169 billion to the semiconductor supply chain. To address the pertinent security issues of IP theft, overproduction, reverse engineering, counterfeiting, Trojan insertion, and data hacking effectively, hardware level design-for-trust techniques including logic locking (digital and analog, see below), watermarking, camouflaging, and IC metering have been proposed. The majority of hardware security measures are only applicable to digital circuits and are not suitable for implementation on analog circuits.

The security of analog mixed-signal (AMS) circuits, however, is of importance as 25% of the reported counterfeit incidences occur in AMS systems. In addition, there is a large increase in demand for analog mixed-signal circuits with varied capabilities due to a growing demand for Internet of Things (IoT) devices, which are used in a wide array of applications from household products to defense systems. According to an IHS report, the number of IoT devices is estimated to increase by around 200% from 2019 to 2025. As more and more IoT devices are produced, securing the circuits against hardware security threats including counterfeiting, overproduction, reverse engineering, and Trojan insertion becomes challenging. As AMS systems are vulnerable to a wide range of threat vectors, the unsecured analog circuit blocks also present an exploitable point of entry to the IC even when the digital IP is protected.

Digital Logic Locking

There are two distinct categories of digital logic locking techniques: 1) methods that obfuscate within the logic cone, and 2) the addition of circuitry that produces errors in circuit functionality when an incorrect key is applied. Techniques that insert XOR/XNOR, LUT, and MUX based secure gates within the original logic cone have been developed. Optimization of circuit locking techniques to lower the overhead in power, area, and performance and selection algorithms to determine the optimal insertion point of the secure gates in the circuit are also known.

The SAT attack proposed in some publications resulted in the development of techniques that add additional circuitry to increase the total number of distinguishing input patterns (DIPs) needed to successfully execute the SAT attack. However, while the methodologies provide a provable means to quantify the number of iterations required to execute the SAT attack, some of the methods are vulnerable to the removal of the added circuitry. To prevent removal attacks, more recent techniques alter the original logical functionality of the IC and implement added circuitry to rectify the altered minterms when the correct key is applied.

Analog Logic Locking

A key-based locking/unlocking mechanism for a sense amplifier circuit uses a memristor-based voltage divider implemented to provide a variable voltage bias to the body of the transistors of the sense amplifier. A memristor crossbar structure allows for the programming of the voltage divider, which results in the correct circuit functionality only when the correct 16-bit key is applied. The practical application of the method is limited as memristors are not readily available and the fabrication of the memristors is incompatible with standard CMOS processes.

A current mirror based combinational locking technique utilizes transistors of different sizes to mask the current gains of the analog circuit. Based on the applied key sequence, a range of current values are set. A satisfiability modulo theory (SMT) based algorithm is used to generate a unique key. The primary disadvantage of current mirror based combinational locking is that the technique is limited to masking the biasing currents of an analog circuit.

Key based performance locking of analog circuits, where locking circuitry is inserted into an analog IC to mask biasing conditions, gains, operating frequencies, and performance parameters are also known. In the parameter obfuscation technique, the sizes of the transistors used to set the optimal biasing conditions are masked using parallel (vector) and mesh-based transistor arrays. Based on the applied key, a subset of the transistors in the vector or mesh are activated to produce an overall effective transistor width over length ratio (W/L)eff. Proper analog circuit functionality is only achieved when the correct key is applied. The SMT based search space exploration methodology may be applied to ensure that only a single correct key exists that sets the optimal circuit performances and that incorrect keys result in significant degradation in the performance of the analog circuit blocks (i.e. eliminate keys that set "good enough" performance values).

AMS Logic Locking

Prior art logic locking methodologies obfuscate the digital part of the mixed-signal IC. Specifically, the stripped functionality logic locking (SFLL) technique may be implemented on the digital portion of the circuit to lock the entire mixed-signal IC. Digital circuitry responsible for the post-silicon tuning of the analog circuits is obfuscated using the SFLL logic locking technique. The primary disadvantage of only obfuscating a digital portion of an AMS IC is that no protection is offered to the purely analog blocks. In addition, all prior work to secure AMS circuits applied techniques that independently protect the analog and/or digital blocks.

SUMMARY OF THE EMBODIMENTS

An analysis of applying disjoint security measures to the analog and digital circuit blocks of an AMS IC is, therefore, provided herein. In addition, a methodology to generate a functional and behavioral dependency between the analog and digital circuit domains is developed herein that increases the security and effective key space of the IC.

DETAILED DESCRIPTION OF THE EMBODIMENTS

Introduction

Figure 1:
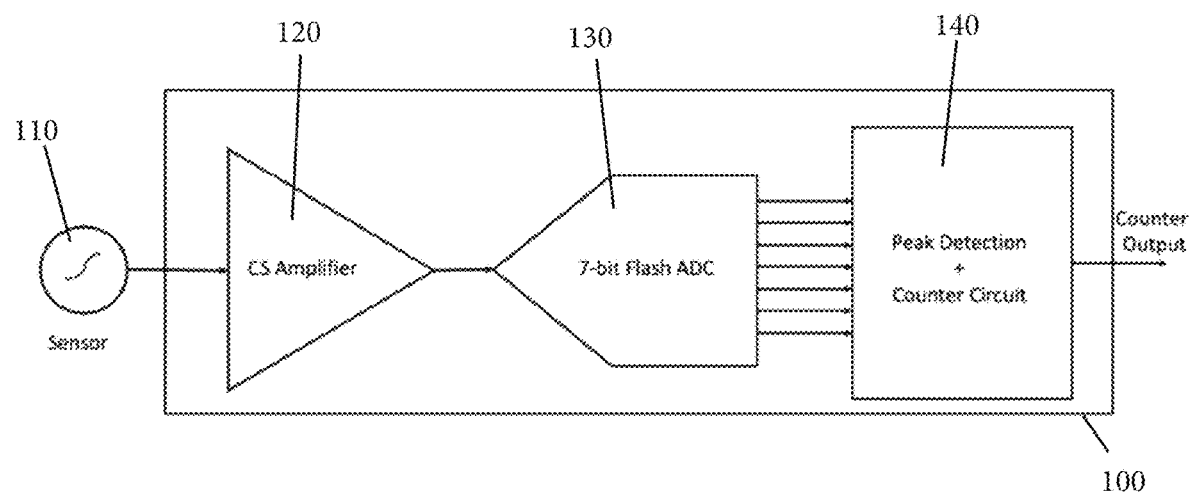
FIG. 1 shows peak detection and counting circuit.

To address the growing need of protecting AMS IP, a system/method described herein may concurrently secure both analog and digital circuit blocks. The analog block may be protected with a parameter-based obfuscation technique that masks the dimensions of the transistors used to implement vital components of the analog circuit. The analog circuit only operates as intended when the correct key is applied. The digital portion of the AMS circuit may be protected with two different logic locking strategies; the XOR methodology and the modified logic cone methodology. The correct functionality of the digital block may also be dependent on the application of the correct key to the circuit.

An analysis of the security of independently locked analog and digital circuit blocks may is provided herein. An attack that isolates the analog and digital circuit blocks is described as well, limiting the effective key space of the secured circuit. The analog and digital blocks may be modified to include correlated key dependencies within the circuit, which results in an increase in the level of difficulty to attack the IC.

Both the analog and digital circuits may be attacked with a satisfiability modulo theory (SMT) based technique that explores the logical and functional search space generated by a 16-bit key, where the attack is characterized by the number of iterations required to determine the correct key. The system and method described herein include:
- protection of analog mixed-signal circuits by obfuscating both the analog and digital sub-components,
- an analysis of the security of the analog mixed-signal circuit using a SMT based search space exploration technique, and
- the development of a methodology to generate functional and behavioral dependencies between the analog and digital domains that results in an increase in the adversarial key search space.

Threat Model

The threat model described herein by way of nonlimiting example assumes that an adversary possesses the tools and knowledge necessary to reverse engineer the IC and produce an extracted locked netlist representation of the circuit. To obtain the logically functional representation of the circuit, an adversary must determine the correct keys for the obfuscated portions of the IC. In addition, an adversary is assumed to possess an activated IC, which is used to obtain input-output pairs that allow for the efficient pruning of the key space when applying a SAT based attack. An adversary is assumed to have access to a second activated IC, which is used to modify a subset of the applied key bits. The adversary also has complete access to the scan chain of the IC, which allows for the read-out of the internal circuit state.

Vulnerabilities of Independently Secured Analog and Digital Circuit Blocks

Research on protecting ICs from a multitude of threats has resulted in methodologies to independently secure analog and digital circuits. In a typical AMS IC pipeline, multiple components of the circuit must be secured against reverse engineering. A discussion on potential vulnerabilities of independently securing the analog and digital blocks is provided in this section. An overview of the AMS pipeline used as an example throughout this is also described below. A description of the implemented obfuscation technique is provided thereafter. An analysis of an attack to determine the key of the analog and digital circuits through isolation of each block is described in the final subsection.

Proposed AMS Circuit Implementation

A peak detection and counting circuit 100 includes an analog front end common source amplifier 120, analog-to-digital converter 130, and digital back end 140, in communication with a sensor 110 as shown in FIG. 1. The peak detection and counting circuitry may be applicable to a wide-range of applications including heartrate monitoring devices, mass spectrometers, X-ray machines, and image processing applications. The analog front end 120 may include the common-source amplifier with a diode connected load used in the detection and amplification of a low-voltage output signal from a sensor 110. The output of the amplifier 120 may be applied to a 7-bit flash analog-to-digital converter (ADC) 130. The output of the ADC 130 may be connected to a back-end digital computation block comprising of a peak detection circuit and a counter 140. Two output bits from the ADC 130, referred to as Bit-1 (B1) and Bit-2 (B2), are applied to the peak detection circuit 140, where a bit flip from 0 to 1 on B1 implies the detection of a peak over a set threshold voltage and a bit flip from 1 to 0 of B2 returns the circuit to an active detection state.

Figure 2:
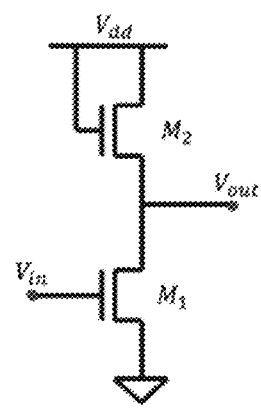
FIG. 2 shows the schematic of the proposed common-source (CS) amplifier.

Common Source Amplifier With Diode-Connected Load.
The schematic of the proposed common-source (CS) amplifier is shown in FIG. 2 which shows voltages in and out, transistors $M_1$, $M_2$, and drain $V_{dd}$. Due to challenges in fabricating large on-chip resistors that fall within a tight tolerance, diode connected loads may be preferred but are not required. The gain of the common source amplifier is given by $$A_v = -\frac{1}{1+\eta}\sqrt{\frac{\left(\frac{W}{L}\right)_1}{\left(\frac{W}{L}\right)_2}}, \quad \text{EQ. 1}$$

where η is the back-gate transconductance parameter and $(W/L)_1$ and $(W/L)_2$ represent the width over length ratios of transistors M1 and M2, respectively. From EQ. (1), the amplifier gain is neither a function of the bias current nor the input signal, which results in a linear amplifier gain, tolerance to input and output voltage level fluctuations, a high input resistance, and a high open loop-gain. In addition, the gain of the amplifier is a function of the transistor sizes, which provides a direct design parameter available to obfuscate the amplifier gain. In the proposed obfuscated circuit, the common source amplifier is designed to produce a gain of 8× when biased by a DC voltage of 0.45 V for an input signal with a peak-to-peak amplitude of no more than 0.04 V.

Figure 3:
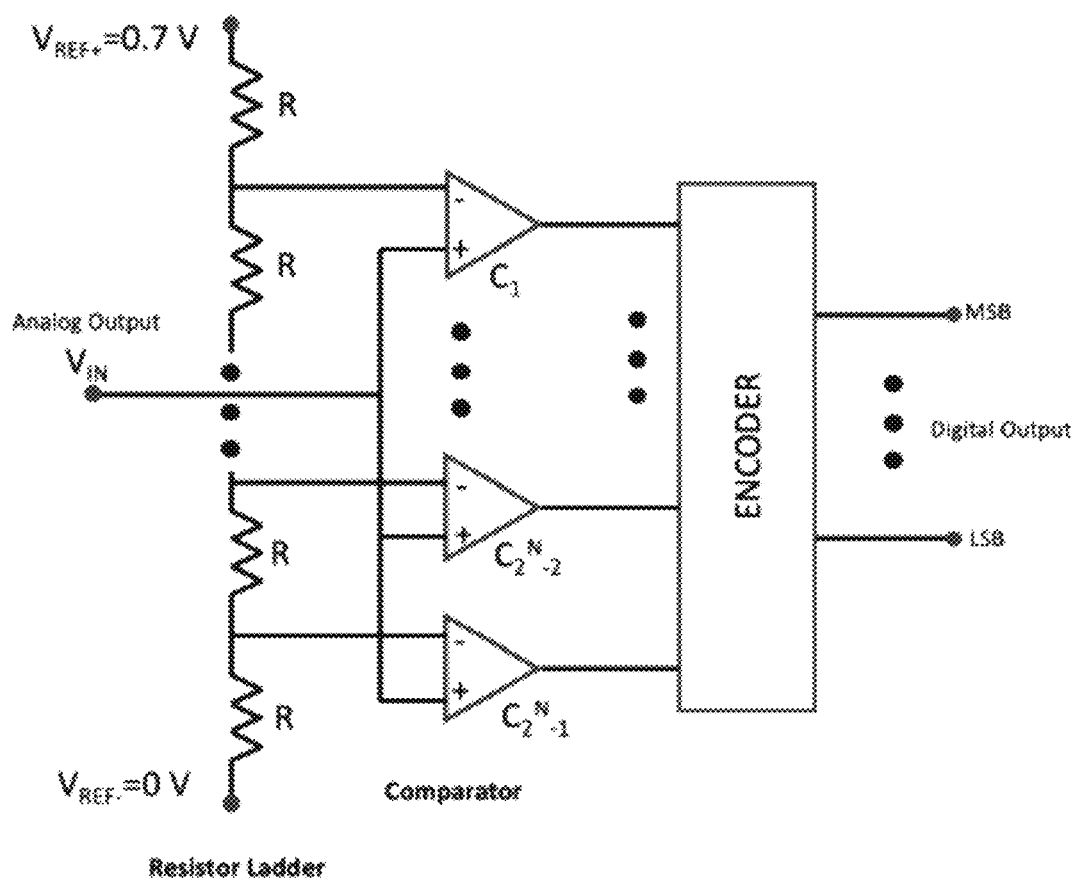
FIG. 3 shows a 7-bit flash ADC.

7-Bit Flash Analog-to-Digital Converter. The amplified signal may be digitized using a 7-bit flash ADC as shown in FIG. 3, which has circuit components labeled as voltages, resistors, comparators, etc. The ADC includes a $2^N$ resistive divider providing the reference voltage for the $2^N-1$ comparators. A logic 1 may be produced when the analog voltage is higher than the set reference voltage applied to the comparator. Otherwise the output from the individual comparators is a 0. The combined outputs from all the comparators results in a thermometer code, which is then translated to the appropriate digital output code using an encoder.

Figure 4:
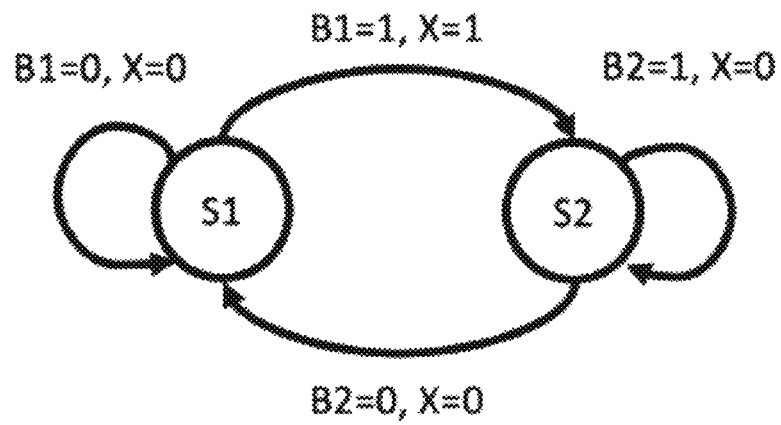
FIG. 4 shows a state machine diagram of the circuit.

Peak Detection and Counting Circuit. The peak detection circuit connected to the output of the ADC is set to a voltage threshold of 0.6125 V, which determines if the most significant bit of the ADC (B1) transitions to a logic 1. A state machine diagram of the circuit is shown in FIG. 4, where state S1 signifies the system is waiting for the detection of a peak and S2 signifies the state of the system once a peak has been detected. The circuit only detects another peak after the voltage falls below a second set threshold (0.525 V for the designed circuit), which is represented by the second most significant bit of the ADC (B2).

Once a peak is detected, the output signal X is used to advance a 3-bit counter. By monitoring the output of the counter, the circuit is able to detect peak bursts or signal abnormalities if a large number of peaks are observed over a bounded period of time.

Implementation of the Obfuscation Techniques

Obfuscation techniques may be implemented on both the analog and digital blocks of the circuit. The 7-bit flash ADC may be the only unobfuscated block of the IC. A parameter obfuscating technique may be applied to the analog circuit with a 10-bit key. The digital circuit may be obfuscated with a 6-bit key using a combination of XOR-based logic encryption and stripped functionality logic locking (SFLL). The total key length applied to the circuit may be 16-bits.

Analog Circuit Obfuscation. The gain of the common source amplifier may be masked using a vector-based parameter obfuscation technique. Parameter obfuscation is a key based technique that targets the physical dimensions of the transistors used to set the optimal biasing conditions of the circuit. The width of a transistor is obfuscated and, based on an applied key sequence, provides a range of potential biasing points. Only when the correct key sequence is applied and certain transistor(s) are active, are the correct biasing conditions at the target node set.

The effective transistor W/L ratio of the diode connected load may be masked by using ten diode-connected load transistors each with different sized transistor widths connected in parallel. Each of the ten transistors may be either activated or remain deactivated based on a digital key applied through a decryption block implemented using pass transistor logic. From (1), the gain of the CS amplifier is inversely proportional to the square-root of the W ratio of transistor M2. The desired transistor width may only be set when the correct key is applied, which produces the target amplifier gain Av.

Digital Circuit Obfuscation. The digital circuitry may be obfuscated with two separate techniques. The first is an implementation of XOR based logic locking within the counter of the digital block. The selection strategy for the XOR based locking technique was random and two XOR gates were inserted within the counter circuit. The second technique may be applied to the logic cone within the peak detection circuit, where the circuit is modified for a single minterm input. The circuit may produce a zero Hamming distance from the inputs of the digital block and the applied key is utilized to correct the flipped minterm.

The circuit with the Hamming distance compares four key inputs and four inputs from the peak detection circuit. The four monitored inputs include B1 and B2 from the output of the ADC and the two outputs from the registers of the state machine shown in FIG. 4. The added security of the circuit is, therefore, bounded by $2^4$ distinguishing input patterns (DIPs), where the number of DIPs is correlated to the size of the circuit being secured.

Attacking AMS Blocks in Isolation

The system level schematic shown in FIG. 1 may include a 10-bit key applied to the CS amplifier 120 and a 6-bit key applied to the digital peak detection and counter circuit 140. When protecting both circuit blocks, the objective is to include obfuscated circuitry that adds to the overall security of the IC, which is bounded by a key space of $2^{16}$ combinations. However, if not properly implemented, an adversary may be able to isolate the analog and digital circuit blocks, which allows for the independent determination of both the key for the CS amplifier and the key for the digital peak detection and counter circuit. Two techniques to isolate the analog and digital blocks are described: 1) using saturating conditions of the analog circuit block and 2) partially altering the keys of an activated IC.

Saturation Conditions of the Analog Circuit. The CS amplifier of the AMS circuit produces two responses that are known independent of the key. The first response is a result of applying a 0 V input to the CS amplifier. Independent of the applied gain set by the key, the output of the amplifier remains 0.45 V (the DC offset). A logic 0 is produced at the input of the digital circuit for both B1 and B2, which results in the generation of SAT based constraints that more efficiently attack the key space. The second response is due to the saturation of the CS amplifier, which results in an output of 1.8 V, the set power supply voltage (VDD) for the 180 nm technology node used for SPICE simulation. Therefore, applying VDD to the input of the amplifier produces a known output of VDD. DIPs are, therefore, generated for the digital circuit when an all one input is applied to the peak detection circuit. Applying the known logic zero and logic one constraints results in the SAT attack determining the key of the digital circuit in four iterations. Once the digital key is determined, the analog key is now vulnerable to an isolation attack, essentially reducing the key space to $2^{10}$ combinations from the maximum possible combinations of $2^{16}$.

Partial Activated IC by Applying Semi-Correct Key. As part of the threat model described, an adversary is assumed to possess access to a second activated IC. The second activated IC allows for partial key modifications, whether applied solely to the digital or analog portions of the circuit. For example, consider an adversary attempting to attack the key of the analog block in isolation. The adversary must determine a set of key values and inputs to the peak detection and counter circuit that exposes the value of the ADC bits (sensitizes the ADC bits). The miter circuit of the AMS circuit shown in FIG. 1 may be used to determine an input pattern that is dependent on the value of B1 at the output of the digital block. The key inputs and scan chain inputs of the digital circuit are modified and applied to the second activated IC, which allows for the correct determination of the B1 bit based on the input voltage applied to the CS amplifier. The adversary is, therefore, able to set a voltage input to the amplifier that results in the switching of the output of the digital circuit. Inputting a voltage (0 V and VDD) as a constraint to the circuit eliminates all but the correct key, which allows the adversary to decrypt the analog block and reduce the key search space from a maximum of $2^{16}$ combinations to $2^6$.

The opposite condition also applies, where the adversary simply determines the output of the ADC that isolates the digital portion of the AMS circuit. The adversary may apply a SMT solver to determine input and key conditions to the analog block that result in the desired ADC outputs, at which point the activated response of the digital system is obtained. The conventional SAT attack may then be then executed on the digital block 140 of the circuit 100. For each determined DIP of the digital block by the SAT solver, the circuit input and key inputs to the analog block are determined such that the target B1 and B2 values are generated. Executing the described attack on the given AMS circuit may require only three iterations of the SAT attack to determine the correct digital key.

Adding Key Dependencies Between Analog and Digital Circuit Blocks of an AMS Circuit An attack on a secured AMS circuit that isolates the digital and analog blocks by applying saturating inputs and/or partial key modifications on an activated IC is demonstrated herein. The generation of key dependencies between the AMS circuit blocks is described in this section, which results in an increase in the difficulty of determining the key of an AMS circuit when isolating the digital and analog blocks.

Figure 5:
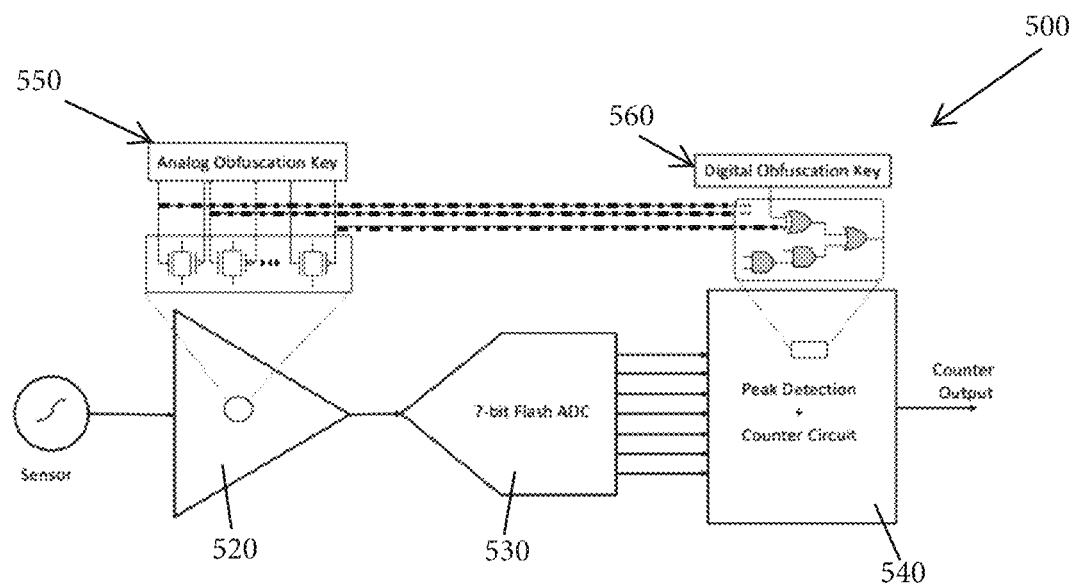
FIG. 5 is a modified version of the circuit of FIG. 1.

To correlate the key response of the analog and digital circuits, an XOR gate with two key inputs, one from the analog circuit and the other from the digital block, may be used. The system model shown in FIG. 1 is now altered to that shown in FIG. 5, with the added correlation between the keys of the analog and digital blocks shown in dashed lines (interconnects between the analog obfuscation key and digital obfuscation key in FIG. 5).

To implement the interdependence between the analog 520 and digital 540 blocks, four random pairs of analog 550 and digital 560 key bits are chosen and XORed together. By including the correlated keys, the circuit 500 is no longer vulnerable to the attack described herein that exploits saturating zero and one inputs to trim the key space. Instead, eight valid digital keys remain after the application of the saturating conditions. Essentially, the SAT attack is able to deduce that the analog and digital keys are either equal or inverses of one another, but is not able to determine the value of either key.

Execution of the partial key attack described above no longer results in the determination of the key of the digital block as the output is also dependent on the analog key bits. As an example, the SAT solver may be applied to generate a condition that outputs a value of 1110000 by the ADC 530. Even though the output of the ADC 530 is known, the generated analog key is also provided to the digital block 540, which results in a functionally incorrect output from the IC. The adversary is, therefore, forced to concurrently consider the analog and digital blocks of the IC to determine the key.

To attack the linked blocks, the saturating conditions may be first applied. The key space is constrained to eight possible digital key values, which reduces the key space from $2^{16}$ to $2^{13}$ combinations.

A SMT based attack is then applied to the analog portion of the AMS circuit by generating a miter circuit that is inputted to a satisfiability modulo theory (SMT) solver. The SMT solver allows for the mathematical expression of the gain equation of the CS amplifier. Simply applying a miter circuit with analog parameters includes challenges as a floating point value differing by a single least significant bit (LSB) generates an undesired but valid miter circuit constraint. To eliminate a larger set of keys per generated DIP, a range of applied voltages is applied to the activated IC. As an example, consider a DIP generated with an input voltage of approximately 0.0378 V and the internal state registers in the digital block set to 01110. The saturating conditions of the circuit are first checked for the given internal register state. The circuit switches one of the output register values of the counter for the operating range of the amplifier (less than 0.04 V). Since the output switches based on the applied input to the CS amplifier alone, an adversary knows that the obfuscated gain of the amplifier is vulnerable to attack. To exploit the condition that an applied voltage within the operating input voltage range of the amplifier switches B1 or B2 from a logic 0 to a 1, the initial input voltage of the DIP (0.0378 V in this example) is varied by 30% to determine if the logical output of B1 and B2 changes. The 30% range on either side of the applied input voltage to the ADC generated by the DIP can be constrained more aggressively. A larger range provides a greater probability to observe the change at the output of the circuit, but results in a less constrained key space. A smaller range more effectively constrains the key space, but results in greater difficulty in determining the toggle voltage of B1 and B2. For the implemented peak-detection circuit, three DIPs with a 30% search margin are sufficient to constrain the AMS circuit to return the correct key. The attack on the entire AMS circuit required 12 iterations of the SAT solver, which was substantially greater than the three total iterations required when attacking the analog block in isolation or the four total iterations when independently attacking the digital block. As AMS circuits require protecting digital and analog IP, an assurance that the added security is not vulnerable to isolation attacks is needed. The proposed method that links the keys of the analog and digital sub-blocks resulted in a significant enhancement of the security of the implemented circuit.

Securing AMS Systems

The analysis of the security of the AMS peak detection circuit indicates multiple considerations to account for when concurrently securing analog and digital circuit blocks. The following design criteria is provided as a guide to properly secure AMS circuits:

(1) The analog and digital circuit may be evaluated for input-output combinations that are independent of the applied key. For the AMS circuit herein, an input voltage of 0 V sensitizes and isolates the digital circuit block as shown. To avoid such conditions, the generated digital key may account for saturating DIPs, or the AMS circuit may be dependent on the key for all the possible inputs.

(2) Independently securing digital and analog blocks may be avoided. Therefore, a technique is proposed herein to link the analog and digital keys. Such dependencies prevent an adversary from extracting circuit information by partially altering the key of an activated IC.

(3) Ensure that the scan chain and internal testing points are inaccessible to adversaries. The AMS pipeline may be highly susceptible to attack as every register within the digital block was accessible. The observability of all of the registers permits access to the ADC output, which results in increased isolation of the analog and digital circuit blocks. Obfuscation, or limitation, of the scan chain and testing circuits may prevent an adversary from efficiently determining the key used for logic locking.

While the invention has been described with reference to the embodiments herein, a person of ordinary skill in the art would understand that various changes or modifications may be made thereto without departing from the scope of the claims.

The invention claimed is:

1. A peak detection and counting circuit comprising an analog front end, analog-to-digital converter, and digital back end,
   wherein the analog front end includes a common source amplifier with a diode connected load used in detection and amplification of a low-voltage output signal from a sensor and an output of the common source amplifier is applied to the analog-to-digital converter (ADC) with an output that is connected to the digital back end comprising a peak detection circuit and a counter,
   wherein the two most significant output bits from the ADC, referred to as Bit-1 (B1) and Bit-2 (B2), are applied to the peak detection circuit, where a bit flip from 0 to 1 on B1 implies the detection of a peak over a set threshold voltage and a bit flip from 1 to 0 of B2 returns the circuit to an active detection state.

2. The circuit of claim 1, wherein the common source amplifier produces a gain of 8× when biased by a DC voltage of 0.45 V for an input signal with a peak-to-peak amplitude of no more than 0.04 V.

3. The circuit of claim 1, wherein the amplified signal is digitized using a 7-bit flash ADC.

4. The circuit of claim 3, wherein ADC comprises a 2N resistive divider providing the reference voltage for the 2N−1 comparators.

5. The circuit of claim 1, wherein the peak detection circuit connected to the output of the ADC is set to a voltage threshold of 0.6125 V, which determines if the most significant bit of the ADC (B1) transitions to a logic 1.

6. The circuit of claim 1, wherein once a peak is detected, the output signal X is used to advance a 3-bit counter, wherein by monitoring the output of the counter, the circuit is able to detect peak bursts or signal abnormalities if a large number of peaks are observed over a bounded period of time.

7. The circuit of claim 1, wherein an obfuscation of the circuit is one of the following: (1) an analog obfuscation wherein the gain of the common source amplifier is masked using the vector-based parameter obfuscation technique; (2) an implementation of XOR based logic locking within the counter of the digital block, wherein the selection strategy for the XOR based locking technique is random and two XOR gates are inserted within the counter circuit; and (3) application of obfuscating logic to the cone within the peak detection circuit, where the circuit is modified for a single minterm input.

8. The circuit of claim 1, implemented in one of a heartrate monitoring devices, mass spectrometers, X-ray machines, or image processing applications.

* * * * *